July 2, 1946.  J. ERNEST  2,403,353
AUXILIARY PROPELLER FOR AIRPLANES
Filed Dec. 11, 1943  2 Sheets-Sheet 1

INVENTOR.
James Ernest
BY
ATTORNEY

July 2, 1946.   J. ERNEST   2,403,353
AUXILIARY PROPELLER FOR AIRPLANES
Filed Dec. 11, 1943   2 Sheets-Sheet 2
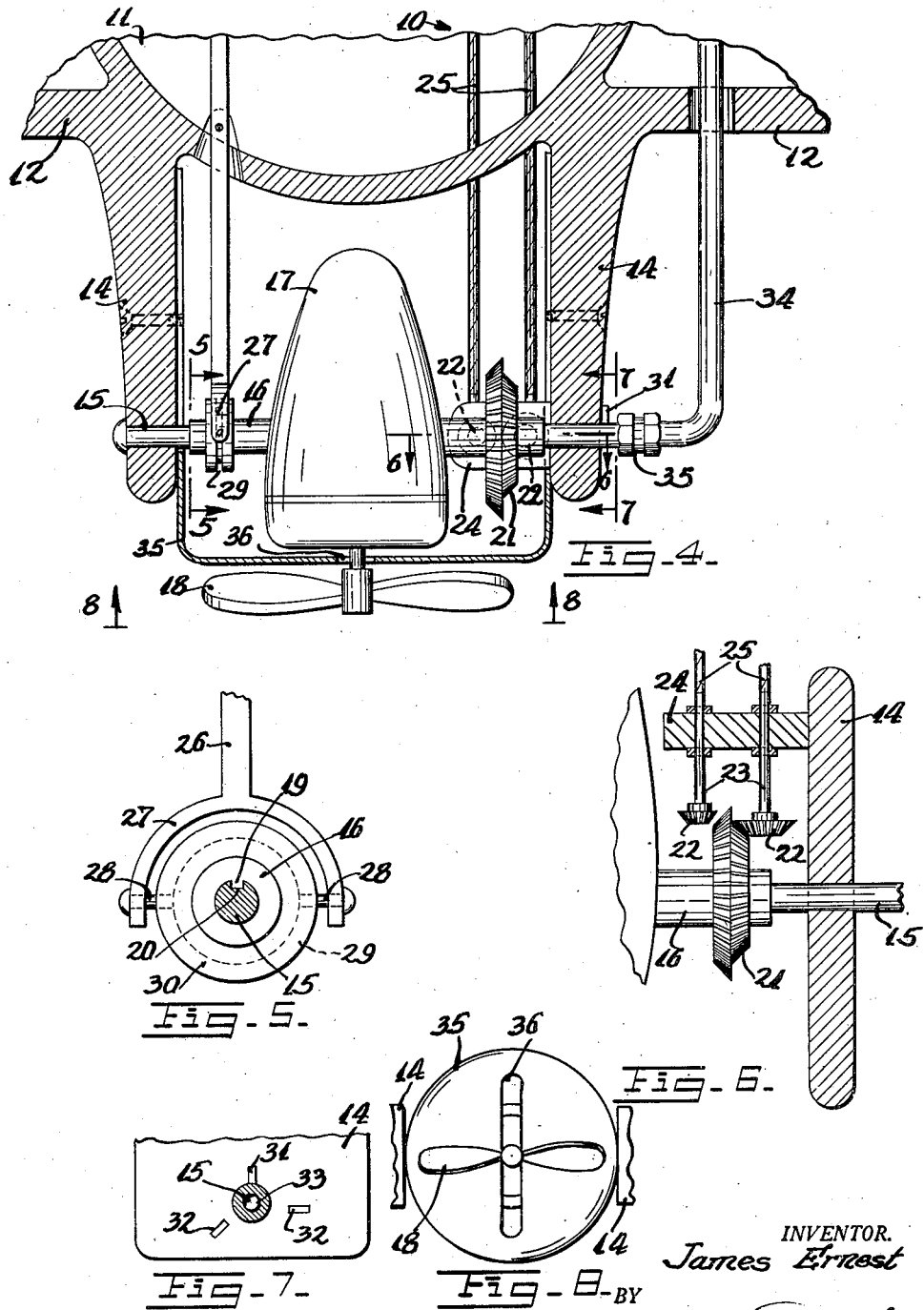
INVENTOR.
James Ernest

Patented July 2, 1946

2,403,353

UNITED STATES PATENT OFFICE 2,403,353

AUXILIARY PROPELLER FOR AIRPLANES

James Ernest, New York, N. Y.

Application December 11, 1943, Serial No. 513,836

1 Claim. (Cl. 244—56)

This invention relates to new and useful improvements in a diverse propeller for airplanes.

More specifically, the invention proposes the construction of a new diverse and revolutionary propeller for airplanes characterized by a motor for driving the propeller turnably supported upon a pair of standards mounted on the bottom of the fuselage in line with the main wings, and arranged in a manner to be directed forwards to change the forward thrust of the plane.

A further object of the invention proposes the provision of a means for turning the motor about its pivots to direct the propeller downwards to a take-off or landing position, or rearwards at an angle to increase the front thrust and speed of the airplane and for rapid climbing.

It is a further object of this invention to create precise and constant vacuums where it is needed and to counteract gravity and air resistance.

Another object of the invention proposes the provision of a means for causing the motor casing to be turned at different speeds and angles at the discretion of the pilot.

Still another object of the invention proposes the provision of means for supplying gasoline to the motor in all of its turned positions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is an enlarged vertical sectional view taken on the line 4—4 of Fig. 1.

Fig. 5 is a vertical sectional view taken on the line 5—5 of Fig. 4.

Fig. 6 is an enlarged horizontal sectional view taken on the line 6—6 of Fig. 4.

Fig. 7 is a vertical sectional view taken on the line 7—7 of Fig. 4.

Fig. 8 is a fragmentary view looking in the direction 8—8 of Fig. 4.

Figure 1:
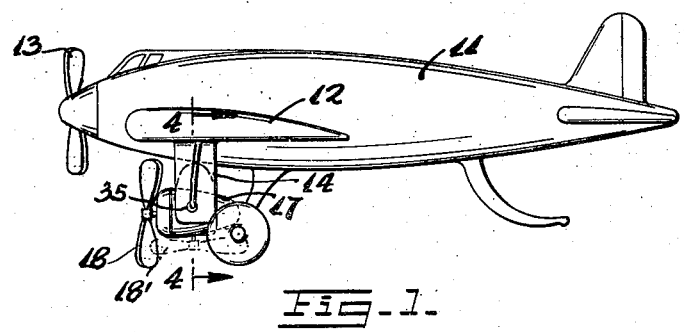
Fig. 1 is a side elevational view of an airplane provided with an auxiliary propeller means in accordance with this invention.

The auxiliary propeller for airplanes, according to this invention, is used in combination with an airplane 10 having a fuselage 11 provided with main wings 12 which extend laterally from the sides of the fuselage 11. The front of the fuselage 11 is provided with the usual motor driven propeller 13.

A pair of standards 14 made of any suitable material and shape is mounted on the bottom of the fuselage 11 in line with the main wings 12 and rotatively supports a solid shaft 15. A tubular shaft 16 is slidably but non-rotatively mounted on the solid shaft 15 and carries a casing 17 enclosing a motor for driving a propeller 18 in an opposite direction to the main propeller. The propeller 18 may be of any standard two or three blade type. The tubular shaft 16 is provided with an inwardly extending tongue 19 which engages a complementary groove 20 formed in the solid shaft 15 for accomplishing the slidable but non-rotative mounting of the tubular shaft 16 on the solid shaft 15.

A pair of opposed beveled gears 21 of different diameters are mounted upon one end of the tubular shaft 16. As shown in Fig. 4, the beveled gears 21 are positioned between a pair of adjacent beveled gears 22 which are fixed upon stud shafts 23. The stud shafts 23 are rotatively supported in a bracket 24 which extends from the inner face of one of the standards 14. Flexible drive shafts 25 extend from the stud shafts 23 and are projected into the fuselage 11 to be connected with a drive means for rotating the beveled gears 22 when desired. The means for driving the flexible shafts 25 is not illustrated on the drawing, and might be an automatic drive provided with an electric motor, or might be a drive terminating in a crank adapted to be manually turned.

Means is provided for shifting the tubular shaft 16 on the solid shaft 15 for engaging the first beveled gears 21 with its respective driven gear 22. This means comprises a pivotally supported lever 26 which extends from the interior of the fuselage 11 and is provided at its bottom end with a forked portion 27 having inwardly extending trunnion pins 28. The pins 28 engage a groove 29 formed in a collar 30. The collar 30 is fixedly mounted on the tubular shaft 16 and pivoting the handle 26 results in the tubular shaft being shifted with relation to the solid shaft 15.

Since the beveled gears 21 are of different diameters their selective engagement with the driven gears 22 will cause the motor casing 17 to be turned at different speeds, depending upon which gear 21 is in operation.

A means is provided for limiting rotation of the shafts 15 and 16 to a position in which the propeller will be directed forwards or to a position in which the propeller will be directed rearwards and downwards at an angle. This means comprises a stop 31 formed on the solid shaft 15 and which operates between spaced stops 32 formed on the adjacent face of one of the brackets 14. This end of the solid shaft 15 is formed with an inwardly extended opening 33 and has a gasoline feed line 34 rotatively connected therewith at a junction 35. Gasoline supplied by said line 34 will be carried to the motor within the casing 17 by the opening 33 extended in from the end of the solid shaft 15. The rotative connection between the gasoline feed line 34 and the solid shaft 15 permits the solid shaft to be turned relative to the said line 34.

A suitable heat insulating hood 35 is provided with a slot 36 for the propeller shaft for keeping the auxiliary device from freezing.

The operation of the device is as follows:

The control lever 26 and the mechanism for driving the flexible shafts 25 will be located within the fuselage 11 of the airplane 10 within reach of the pilot, permitting him to shift the lever 26 to engage either of the driven gears 22 with its respective beveled gear 21.

The means for driving the flexible shafts 25 is then brought into operation to turn the beveled gears 21 and turn the shafts 15 and 19 through the medium of the gears 21. This will rotate the casing 17 and change the angular position of the propeller 18 with relation to the airplane 10. If the propeller is directed forwards, as illustrated in full lines in Fig. 1, it will change the forward speed of the plane. In Fig. 3, the propeller 18 is shown in a rearward position to increase the forward thrust of the plane and increase its forward speed through the air and simultaneously help the plane to climb more rapidly towards high altitudes. The propeller might be directed downwards, as indicated by the dot and dash lines 18' in Fig. 1, and in the full lines in Fig. 2. In this position the propeller 18 will produce an upward thrust, increasing the lift of the airplane, causing it to take off more nearly vertically with a greater load.

Figure 2:
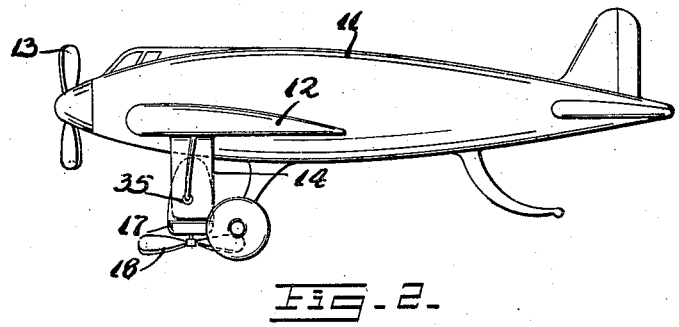
Fig. 2 is a similar view to Fig. 1, but illustrating the auxiliary propeller in a different position.
Figure 3:
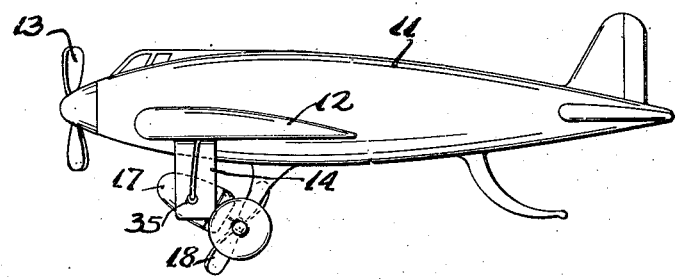
Fig. 3 is another view, similar to Fig. 1, but illustrating still another position of the auxiliary propeller.

In this device when the engine is made to face in the downward direction by the pilot as shown in Fig. 2, the plane will take off in coordination with the front propeller. It will also land when the propellers will be in the same relative position.

When the engine is made to face toward the back as shown in Fig. 3, the speed and the thrust of the plane will be increased and will simultaneously help the plane to climb more rapidly towards high altitude.

The illustration in Fig. 1 shows the two propellers in aligned positions but the propellers are being rotated in opposing directions, to change the speed of the airplane.

It is to be understood that this propeller arrangement may be used for both fighting and commercial type of planes with the following advantages:

1. The airplane will take off and land more nearly vertically.

2. It will climb more rapidly.

3. It will considerably increase the speed of the airplane and will have a longer range.

4. It will considerably increase the cargo capacity of the airplane.

5. By means of this arrangement the lives of the crew will become safer.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

An airplane having a pair of spaced brackets rotatively supporting a first shaft upon which a motor driven propellor unit is turnably supported, means for turning said unit in one direction or the other at different rates of speed, comprising a tubular shaft slidably but non-rotatively mounted on said first mentioned shaft, a pair of spaced driven bevel gears positioned adjacent one end of said tubular shaft, a pair of opposed bevel gears of different diameters mounted on the end of said tubular shaft between said spaced driven bevel gears, means for moving said tubular shaft on said first mentioned shaft one way or the other for selectively engaging either of said opposed bevel gears with its respective gear of said pair of spaced driven bevel gears and means carried by said first mentioned shaft for supplying fuel to said motor.

JAMES ERNEST.